(12) United States Patent
Wulf et al.

(10) Patent No.: US 6,632,013 B2
(45) Date of Patent: Oct. 14, 2003

(54) BLENDER WITH FOOD PROCESSOR CAPABILITIES

(75) Inventors: John Douglas Wulf, Boca Raton, FL (US); Gerald J. Lozinski, Allen, TX (US); Matthew Craig Denton, Hattiesburg, MS (US); Jerry Lee McColgin, Westfield, IN (US); Michael Morton, Boca Raton, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 09/824,271

(22) Filed: Apr. 2, 2001

(65) Prior Publication Data

US 2002/0141286 A1 Oct. 3, 2002

(51) Int. Cl.$^7$ .................................................. B01F 7/16
(52) U.S. Cl. ........................ 366/199; 366/205; 366/206
(58) Field of Search ................................ 366/601, 199, 366/205, 206

(56) References Cited

U.S. PATENT DOCUMENTS

| | | | | |
|---|---|---|---|---|
| 2,794,327 A | * | 6/1957 | Rodwick ...................... 366/205 |
| 3,139,917 A | * | 7/1964 | Elmore ........................ 366/205 |
| 3,731,059 A | * | 5/1973 | Willson ...................... 235/61 A |
| 3,784,118 A | * | 1/1974 | Hurwitz ....................... 366/205 |
| 3,943,421 A | * | 3/1976 | Shibata et al. ............... 366/205 |
| 3,951,351 A | * | 4/1976 | Ernster et al. .............. 366/601 |
| 5,347,205 A | * | 9/1994 | Piland ........................ 366/206 |
| 5,352,874 A | * | 10/1994 | Gong .......................... 219/704 |
| 5,435,235 A | * | 7/1995 | Yoshida ....................... 366/601 |
| 5,556,198 A | * | 9/1996 | Dickson, Jr. et al. ........ 366/601 |
| 5,567,049 A | * | 10/1996 | Beaudet et al. ............. 366/206 |
| 5,829,341 A | * | 11/1998 | Lin ............................ 366/601 |
| 5,845,991 A | * | 12/1998 | Sundquist .................... 366/206 |
| 6,092,922 A | * | 7/2000 | Kett et al. .................... 366/205 |
| 6,283,625 B2 | * | 9/2001 | Frankel et al. .............. 366/205 |
| 6,350,053 B1 | * | 2/2002 | Morin ......................... 366/205 |
| 6,364,522 B2 | * | 4/2002 | Kolar et al. ................. 366/206 |
| 6,402,365 B1 | * | 6/2002 | Wong .......................... 366/206 |

\* cited by examiner

Primary Examiner—Tony G. Soohoo
(74) Attorney, Agent, or Firm—Lawrence J. Shurupoff

(57) ABSTRACT

A blender having a base, a container, and a blade base includes a motor, a microcontroller, memory, a sensor and a user interface. The blade base connects the container to the base and includes a blade unit having at least a first blade and a second blade of a different design from the first blade. The microcontroller is in communication with the memory, sensor, motor, and user interface. Programs with preprogrammed motor commands for desired operations are stored in the memory. The user interface includes a liquid crystal display, or function switches and light emitting diodes. Upon selection of a particular pre-defined function, the microcontroller retrieves the appropriate program from the read only memory and specifies the preprogrammed motor commands to accomplish the selected function.

20 Claims, 10 Drawing Sheets

BLENDER WITH FOOD PROCESSOR CAPABILITIES

FIELD OF THE INVENTION

The present invention relates to an improved blender with food processor capabilities for blending, mixing, processing, slicing, chopping, separating, liquefying, aerating, etc. liquids and/or solids and having preprogrammed routines for the preparation of various food items.

BACKGROUND INFORMATION

Blenders are household devices often used to blend or mix drinks or liquids. On the other hand, food processors are household devices commonly used to chop, cut, slice and/or mix various solid foods such as vegetables, fruits, or meats. Different blade designs and rotation speeds are used in a blender or a food processor in order to accomplish the mixing or cutting actions desired.

Conventional household blenders typically have a motor connected to a blade assembly, and the speed of the rotating blade or motor may be varied based on selections made by the user.

For example, U.S. Pat. No. 3,678,288 to Swanke et al. describes a blender having seven speed selection push buttons. The push-buttons drive slider elements which close switches so as to selectively energize various combinations of fields in a drive motor having multiple fields. Field selection provides seven speeds in a high range. Seven speeds in a low range are obtained by applying only half cycles of the AC energizing voltage to the motor when certain combinations of the switches are actuated. Once a speed selection push button is depressed, the motor is energized until an OFF switch is actuated. The device also has a jogger or pulse mode pushbutton which energizes the motor at one speed only as long as the pushbutton is depressed. Pulsing the motor on/off or at high and then low speeds permits the material being processed to fall back to the region of the cutting knives thereby improving the processing of the material.

U.S. Pat. No. 3,951,351 to Ernster et al. describes a blender having a rotary switch for selecting a high or low range of speeds and five pushbutton switches for selecting a speed within the selected range. The pushbutton switches connect various segments of the motor field winding in the energizing circuit. This device also includes a pulse mode pushbutton which causes energization of the motor only as long as the pushbutton is depressed. The motor may be energized in the pulse mode at any selected speed.

U.S. Pat. No. 3,548,280 to Cockroft describes a blender provided with 10 speed selection switches. A SCR is connected in series with the motor and has a control electrode connected to resistances which are brought into the electrode circuit by actuation of the speed selection switches to control the angle of firing of the SCR and thus the speed of the motor. This device also has a mode selection switch for selecting the manual mode or a cycling or pulse mode in which the motor is alternately energized and deenergized over a plurality of cycles, the number of cycles being set by a potentiometer controlled by a rotatable knob. In a preferred embodiment, the on and off intervals are set during manufacture but two potentiometers may be provided to enable an operator to vary the on and off times.

U.S. Pat. No. 5,347,205 to Piland describes a blender with a microcontroller for controlling energization of the blender drive motor. The speed of the motor is determined by a manual selection of N speed range selection switches, M speed selection switches, and a pulse mode switch.

Typically, the blade attachment in conventional blenders consists of two straight edge blades, a top blade and a bottom blade, joined together at a central point with their respective ends oriented in opposite directions. Because of this blender blade design, conventional blenders have limited applications because they are not able to chop, slice or cut solid food as well as food processors. Food processors, which generally operate at slower speeds than a blender, are able to better chop, slice or cut solid food because of the curved or s-shaped blade design. Liquid typically must be added to the blender in order to successfully liquefy or cut solid food into very small pieces.

Additionally, conventional blenders are not functionally preprogrammed with any motor control commands (e.g., speed, time, direction of rotation) which are automatically implemented when the user identifies a function for the blender, such as to prepare particular types of foods or drinks by selecting a button or key dedicated to the particular food or drink.

SUMMARY OF THE INVENTION

The present invention provides a blender with a novel blade unit design which has improved food processing capabilities. The blade unit comprises a first blade and a second blade of a different design from the first blade. In an exemplary embodiment of the present invention, the first blade is a straight edge blade and the second blade is a curved blade. There may also be an extraction mechanism for the blade unit.

There is also provided a blender which is programmed to accomplish predetermined functions and tasks. The programs are preprogrammed into the microcontroller of the blender and include motor commands which are automatically accessed and implemented upon selection of a desired function.

In an exemplary embodiment of the present invention, a blender comprises a base, a container, and a blade base wherein the base comprises a motor, a microcontroller, a sensor and a user interface. The microcontroller is in communication with the sensor, motor, and user interface, and can include a read only memory, a nonvolatile memory, and a central processing unit. Programs with preprogrammed motor commands are stored in the read only memory. The blade base connects the container to the base and includes a blade unit having at least a first blade and a second blade of a different design from the first blade. The user interface includes, for example, a liquid crystal display, function switches and/or light emitting diodes. Upon selection of a function, the microcontroller retrieves the respective program from the read only memory and executes the preprogrammed motor commands to accomplish the selected function.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well known features may be omitted or simplified in order not to obscure the present invention.

In an exemplary embodiment, a blender apparatus is provided with a novel blade unit design which enables the blender to have improved food processing capabilities. The blender apparatus is preprogrammed with a plurality of routines designed for particular food or drink items, for example, by taking a particular sequence of motor commands (e.g., direction of rotation, speed, duration or time of rotation, etc.) which are automatically implemented based on the function (e.g., end result) selected by the user. Additionally, sensors may be present on the apparatus of the present invention to detect the type of container in which the mixing or processing will take place. Other novel features of the present invention will become apparent below.

Figure 1:
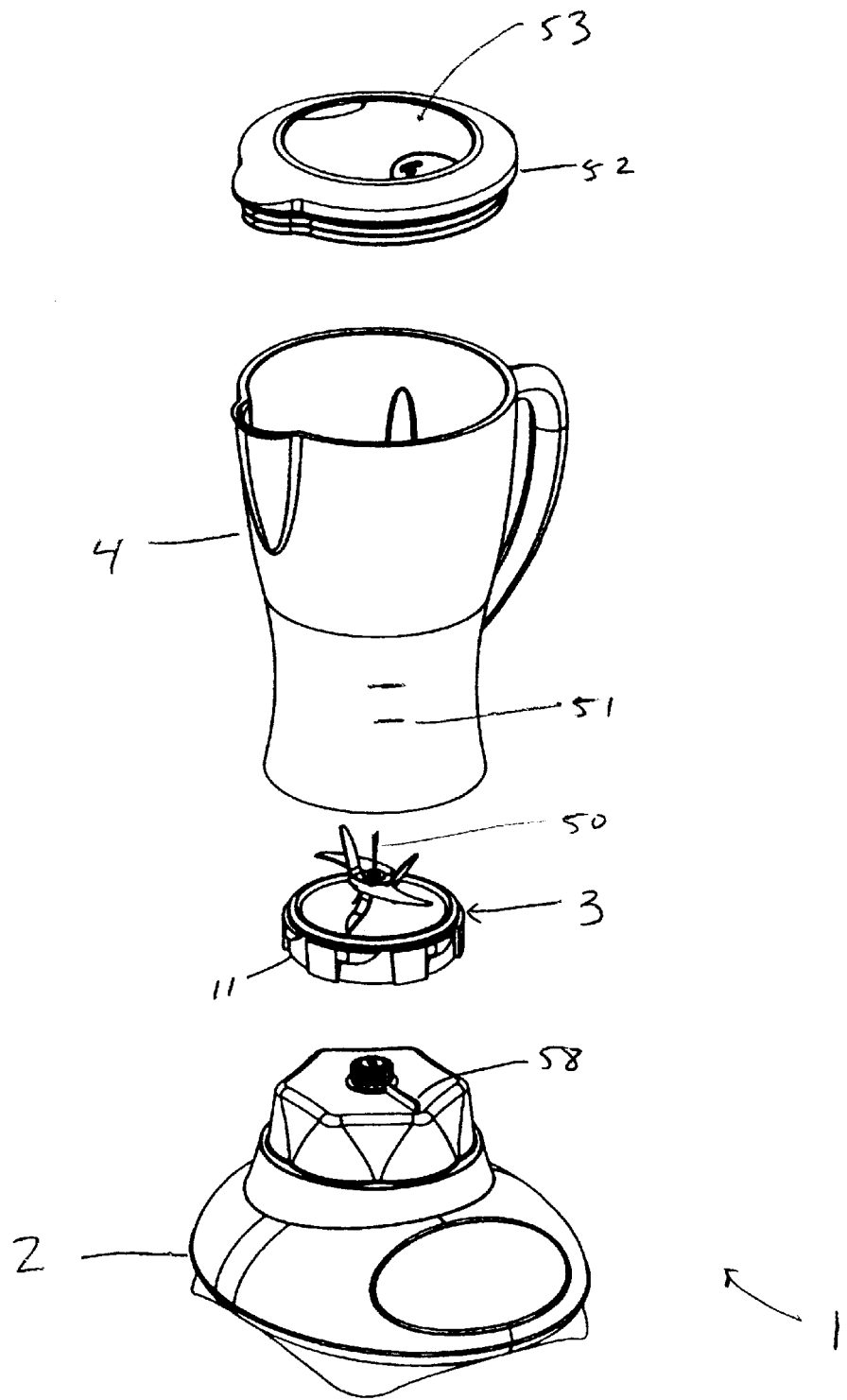
FIG. 1 is an exploded view of an exemplary embodiment of the blender apparatus in accordance with the present invention.

As shown in an exemplary embodiment in FIG. 1, the blender apparatus 1 comprises a base 2, a blade unit 3, and a container 4. The base 2 includes a motor which is adapted to actuate blade unit 3. The motor may be uni-directional (capable of actuating or rotating the blade unit 3 in one direction only), or bi-directional (capable of actuating or rotating the blade unit 3 in either direction) as well as capable of oscillating the blade unit 3. Such motors are well-known to those skilled in the art.

Figure 2:
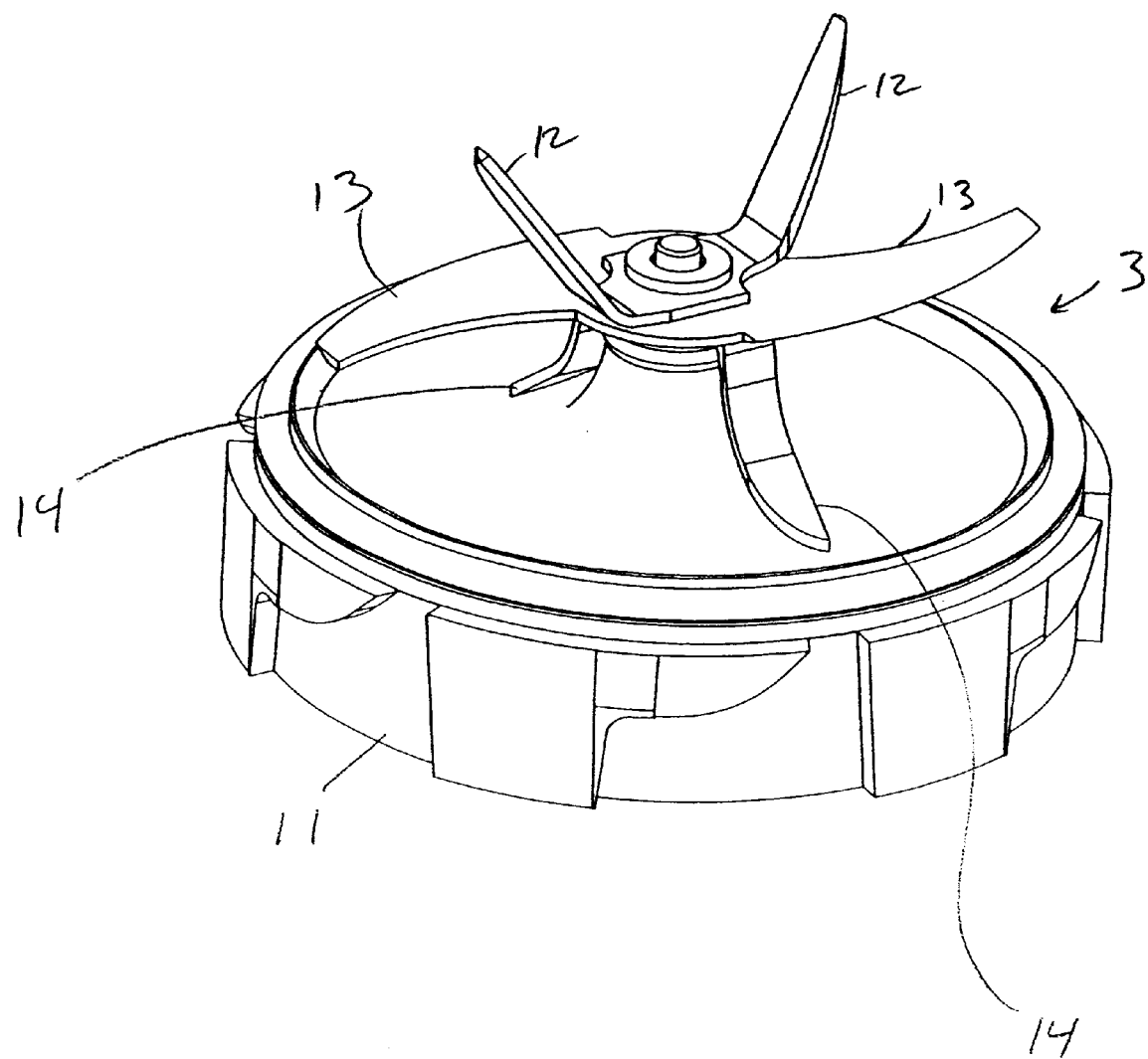
FIG. 2 is an exemplary embodiment of the blade base in accordance with the present invention.

The blade unit 3 can be permanently or removably attached to the blade base 11, which in turn, can be permanently or removably attached to the bottom of container 4. Blade unit 3, as shown in an exemplary embodiment in FIG. 2, includes several blades: top or first blade(s) 12, middle or second blade(s) 13, and third or bottom blade(s) 14. The top blade 12 and bottom blade 14 may be of any conventional blender blade design (e.g., straight edged). The middle blade 13 has, for example, a food processor blade design (e.g., curved, s-shaped). It has been discovered that including a food processor design blade 13 in combination with two conventional blender design blades 12 and 14 enables blender 1 to have superior chopping, cutting, and slicing capabilities which until now were typically limited to food processors. Other arrangements which combine straight edge blender blades with curved food processor blades may be used as well (e.g., two food processor blades and one blender blade, or one food processor blade and one blender blade). These blades may be made of any durable material such as metal, steel, carbon, etc. which can be sharpened and withstand high stress and heat.

Blade unit 3 may also include an optional extraction mechanism 50 which allows a user to disengage blade unit 3 from blade base 11. In an exemplary embodiment as shown in FIG. 1, extraction mechanism 50 comprises a projection extending from the center of the blade unit 3 which the user may pull to disengage the blade unit from the blade base 11. The extraction mechanism 50 may be made of rubber, plastic, or any other suitable nontoxic material.

To prevent the blade unit 3 from rotating out of the container 4 when a bi-directional motor is used and the motor runs in reverse, there is also present in an exemplary embodiment an anti-rotation projection 58 on base 2 as shown in FIG. 1. The anti-rotation projection engages with projections (e.g., projection 8 in FIG. 8) on the bottom of the blade base 11 to prevent the blade base from rotating out of the container when the motor is reversed.

Container 4 may be any container known in the art used with blenders. Containers of any size, shape, function or design may also be used as long as there is a corresponding blade base 11 attached to the container which can properly engage the motor and base 2. Thus, container 4 may be a single serving container useful for recipes such as a drink made for consumption by one person. A food processor container with food processor blades may also be used on the blender apparatus. This container flexibility allows the blender, even though it has enhanced food processor capabilities due to the novel blade design of the present invention, to operate purely as a food processor if desired. Each container 4 can be designed for use with a different blade unit 3 and/or a different blade base 11. Alternatively, certain containers 4 can be designed for use with the same blade unit 3 and/or a same blade base 11. Container 4 can be made from glass, plastic, metal, or any other suitable, nontoxic material which can resist high stress. Additionally, the inside of container 4 can be coated with non-stick coating such as Teflon® and the like to allow for better mixing or easier cleaning. The inside of container 4 may also have a smooth or circular cross sectional area to further promote better mixing or to minimize any accumulation of food or materials which may occur in containers having cross sectional areas with edges or corners (e.g., square, rectangular cross sectional areas).

Markings 51 indicating various ingredient levels for recipes may be placed onto the container 4 to assist the user. For example, there may be markings 51 on a blender container 4 to illustrate the proper amounts of ice or liquids to use for making a drink. Such markings 51 can be a permanent (e.g., etched or embossed) or removable (e.g., removable stickers) part of the container 4.

Figure 7:
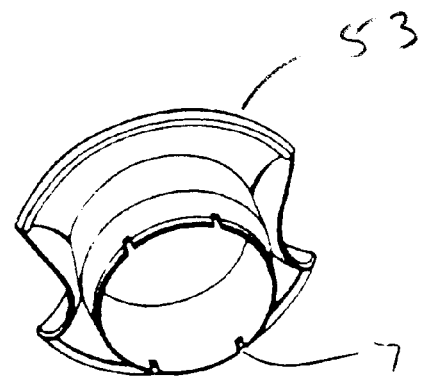
FIG. 7 shows an exemplary embodiment of the cap and lid in accordance with the present invention.
Figure 7:
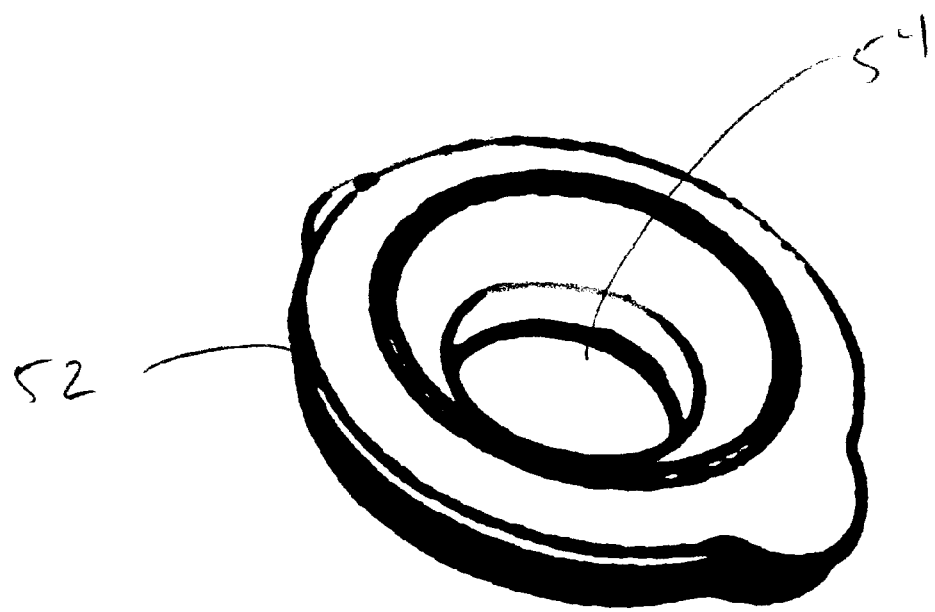
Figure 8:
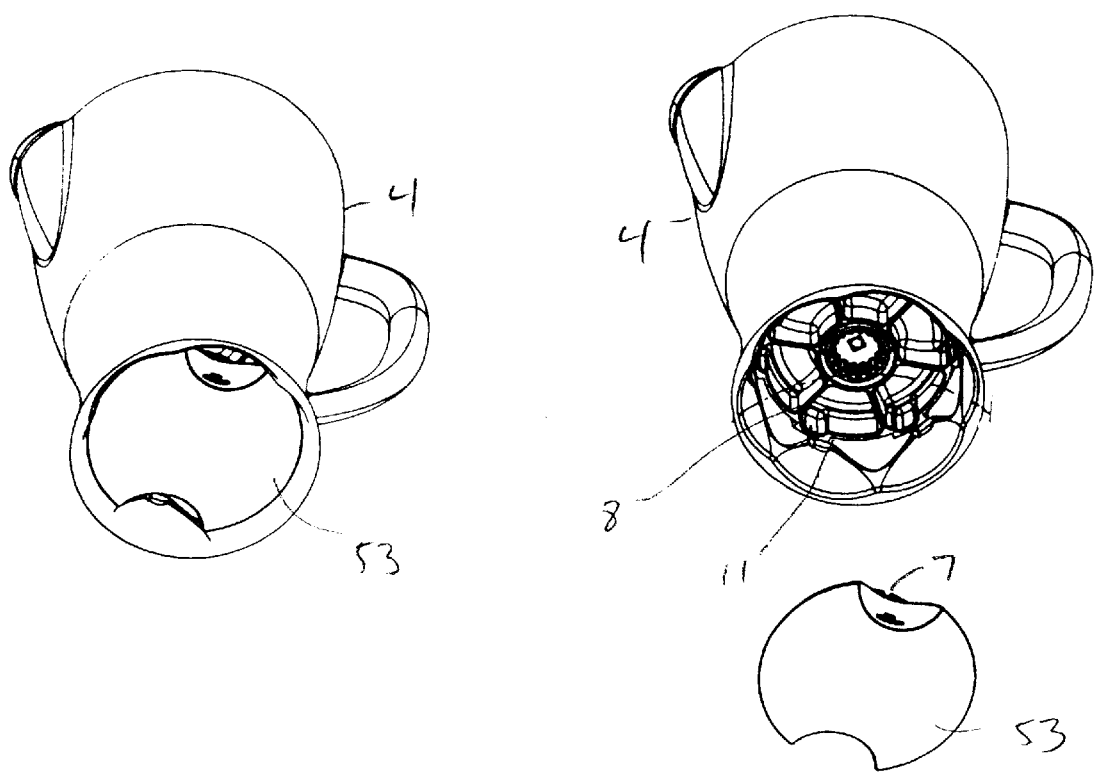
FIG. 8 shows an exemplary embodiment of the interaction between the cap and the bottom of the blade base in accordance with the present invention.

A lid 52 is placed on top of container 4 to keep the food inside the container during operation. Lid 52 may include a lid opening 54 for the user to add materials into the container 4 during the operation of the blender. As shown in an exemplary embodiment in FIG. 7, a multi-purpose cap 53 is used to cover the opening 54 as well as to disengage the blade base 11 from container 4. As illustrated in FIG. 8, the multi-purpose cap 53 includes notches 7 which engage the projections 8 on the blade base 11 to form a fitted connection for easier disengagement (e.g., by turning, pulling, etc.) of the blade base 11 from the container 4.

Figure 3:
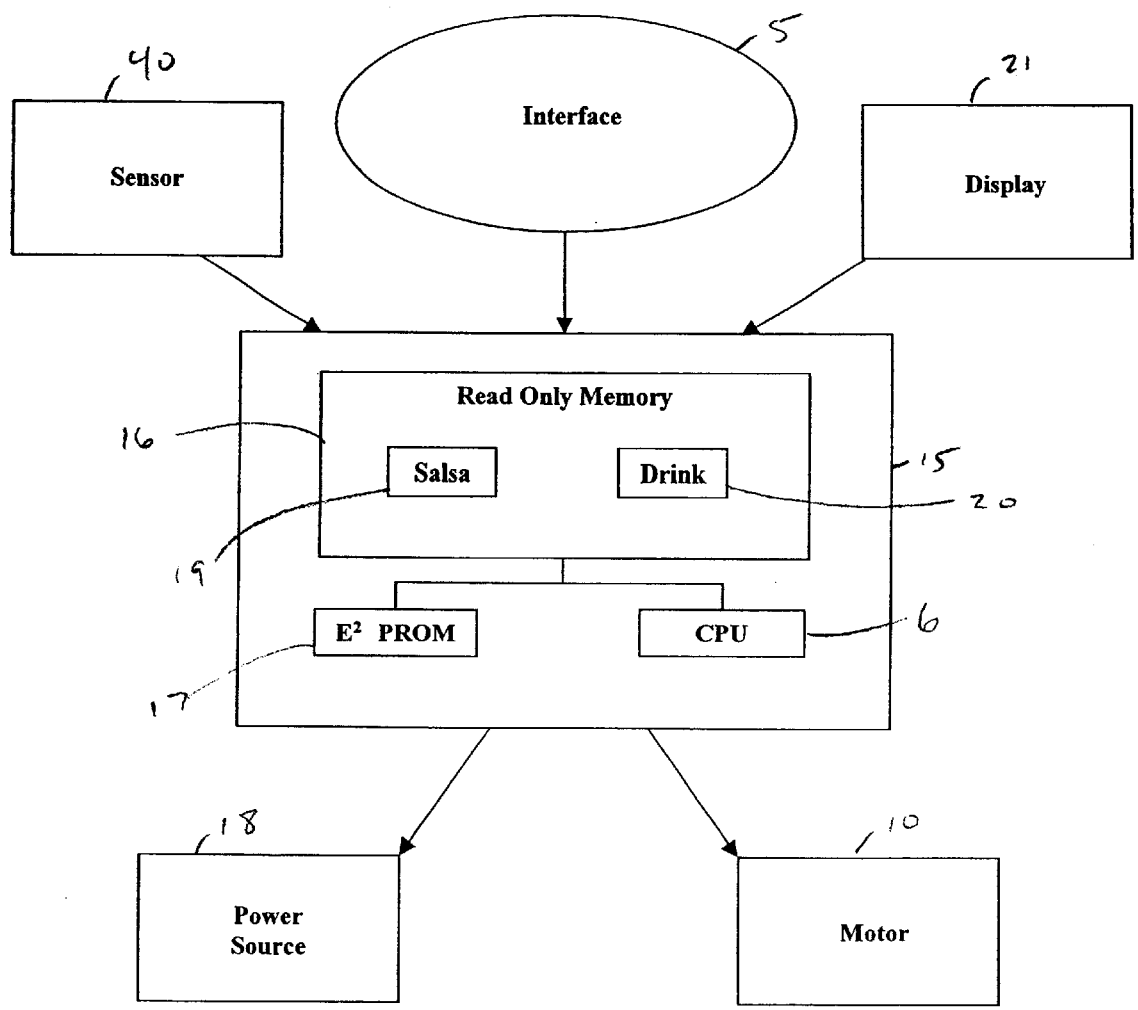
FIG. 3 is a general schematic diagram of an exemplary embodiment of a microcontroller in accordance with the present invention.

Sensors 40 may be present on base 2 to detect which type of container 4 is placed on the base 2. As shown in FIG. 3, these sensors 40 are connected or interfaced with microcontroller 15.

Figure 9:
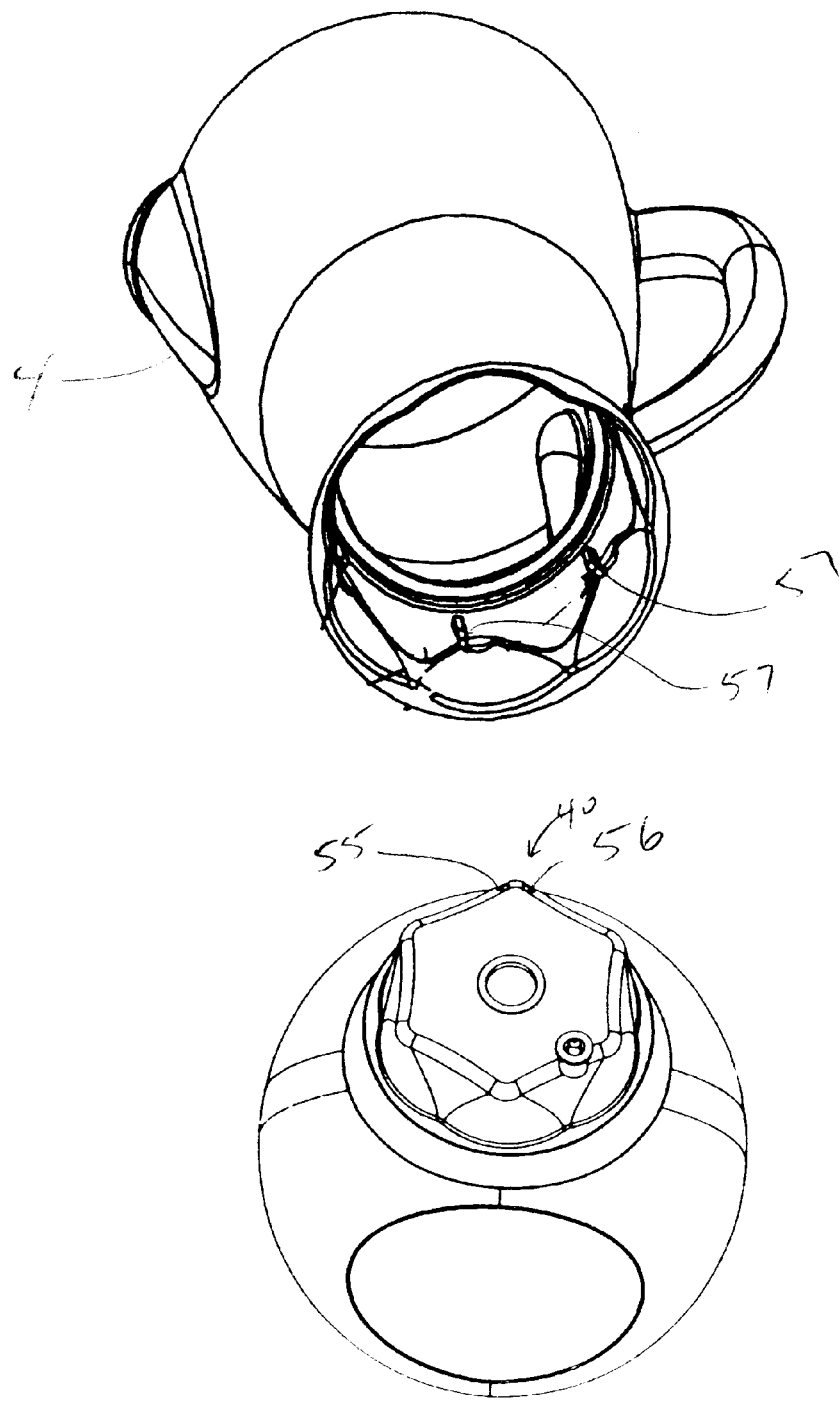
FIG. 9 shown an exemplary embodiment of the interaction between the container and the sensor on the base in accordance with the present invention.

In an exemplary embodiment shown in FIG. 9, sensor 40 includes female members 55 and 56 which are located in different positions on base 2 and are each triggered by a different corresponding male member 57 located on container 4 or blade base 11. For example, female member 55 may only be triggered by corresponding male member 57 as shown while a different male member (not shown) may be needed to trigger female member 56. Additionally, there could be multiple male members 57 which are equidistantly positioned on the container 4 such that the container 4 may be attached to the base 2 from any direction and still trigger the proper female member 55. The triggering of the female member identifies for the microcontroller 15 which container 4 is on base 2 and thus which preprogrammed functions may be used. The triggering of the female members 55 or 56 can depend on location, size, or any other physical properties of the blade base or container. Other sensor technologies (e.g., infrared, electrical, mechanical) known in the art can be used.

Also located on base 2 is a user interface 5 which allows a user to operate the apparatus manually and/or select from the various preprogrammed functions available. As shown in a block diagram in FIG. 3, the user interface 5 is connected to a microcontroller 15 which includes, for example, a central processing unit (cpu) 6, a read only memory 16 and a nonvolatile memory 17, such as electronically erasable programmable memory ("$E^2$ PROM"). The microcontroller 15 is connected to or interfaced with power source 18, motor 10, and display 21.

Read only memory 16 is preprogrammed with various motor commands (e.g., direction of rotation, speed, duration, reversing of rotation, oscillation, etc.) designed to achieve a particular result. Thus, the preprogrammed motor commands are grouped together according to a function of the blender (e.g., the end result or purpose which the blender will be used for). For example, memory section 19 may contain a program with all the motor commands necessary to make salsa; memory section 20 may contain a program with all the motor commands necessary to mix a drink, etc. These preprogrammed motor commands are accessed and implemented upon selection on the user interface 5 of a desired function for the blender.

Additionally, as described earlier, microcontroller 15 may be programmed to only implement certain functions based on which container 4 is detected by sensor 40. For example, microcontroller 15 may be preprogrammed to implement the motor commands for making powdered drinks only if a regular blender or single serving container is used. Thus, if sensor 40 detects a food processor container on base 2, then microcontroller 15 will not allow the powdered drinks program/function to be selected and implemented. In such a circumstance, if the user wants to make powdered drinks with a food processor container, the user would do so manually using the manual speed switches 27 and 28.

In a further exemplary embodiment, the user interface 5 includes a display 21 (see FIG. 4A or 4D) such as a liquid crystal display (LCD) or the like. In such an embodiment, the $E^2$ PROM 17 stores user-selectable parameters for the initial operation of the blender. When the blender 1 with LCD 21 is turned on, the LCD 21 is initialized and set up in accordance with the stored programming from the $E^2$ PROM 17. Additionally, $E^2$ PROM 17 includes programming which will allow the text in LCD 21 to be displayed in multiple languages (e.g., English, Spanish) or units (e.g., metric, English). Further uses for the $E^2$ PROM 17 include subsequent storage of information in order to organize the LCD menu based on the most commonly selected functions or programs (e.g., the creation of a "favorites list").

$E^2$ PROM 17 also includes programming which allows the user to pause a program in operation and then resume the program from where it left off as well as to temporarily continue a selected function when a user pushes pulse switch 25 after a program has ended.

FIGS. 4A, 4B, 4C and 4D illustrate exemplary embodiments for two types of user interfaces 5 which may be used with base 2. One type, shown in FIGS. 4A and 4D, includes LCD 21. Other types, shown in FIGS. 4B and 4C may use one or more light emitting diodes ("LED") 22.

A power switch 23 is included on the LCD and LED variants of the user interface 5 to turn on or off the power, as is a start/stop switch 24 to begin or stop operation of the blender.

There is also a pulse switch 25 which, when depressed, causes a temporary power surge to motor 10. In this manner, the pulse switch 25 serves as a temporary "start" button which will cause the motor to run without hitting start/stop switch 24 as long as it remains depressed. Pulse switch 25 also can be depressed at the end of a program to keep the program or last motor speed implemented temporarily running until the pulse switch 25 is released.

A pause/resume switch 26 can stop the operation of the blender when pressed a first time, and then resume operation of the blender from where it left off when pressed a second time.

The user interface 5 also contains manual speed switches 27 (high) and 28 (low) so that the user can manually control the speed and operating time of the blade unit 3 to perform other functions not preprogrammed into the blender. The user can monitor the relative speed of the motor (e.g., the relative speed of the rotation of blade unit 3) on LCD 21 as the manual speed switches 27 or 28 are pressed. Such relative speed may be indicated by text, bars, symbols, or the like. With the LED-based user interfaces of FIGS. 4B and 4C, the relative speed of the motor is indicated by the position of the lighted LED 22 relative to the speed markers 29 (e.g., high, low; drink, food) or the relative blinking speed of a lighted LED 22.

Figure 4A:
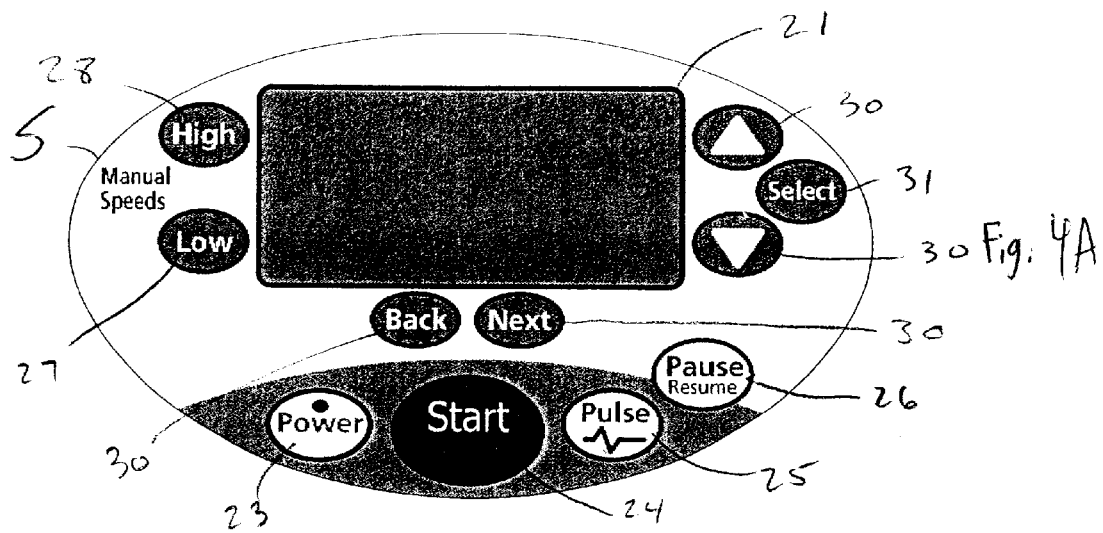
FIGS. 4A, 4B, 4C, and 4D show exemplary embodiments of various user interfaces for the blender apparatus in accordance with the present invention.
Figure 4B:
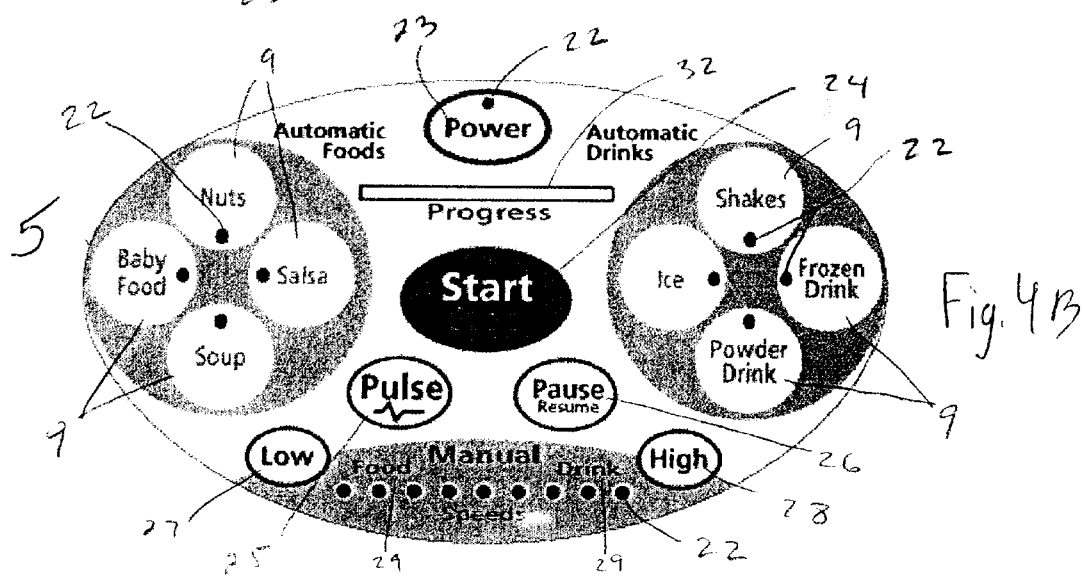
Figure 4C:
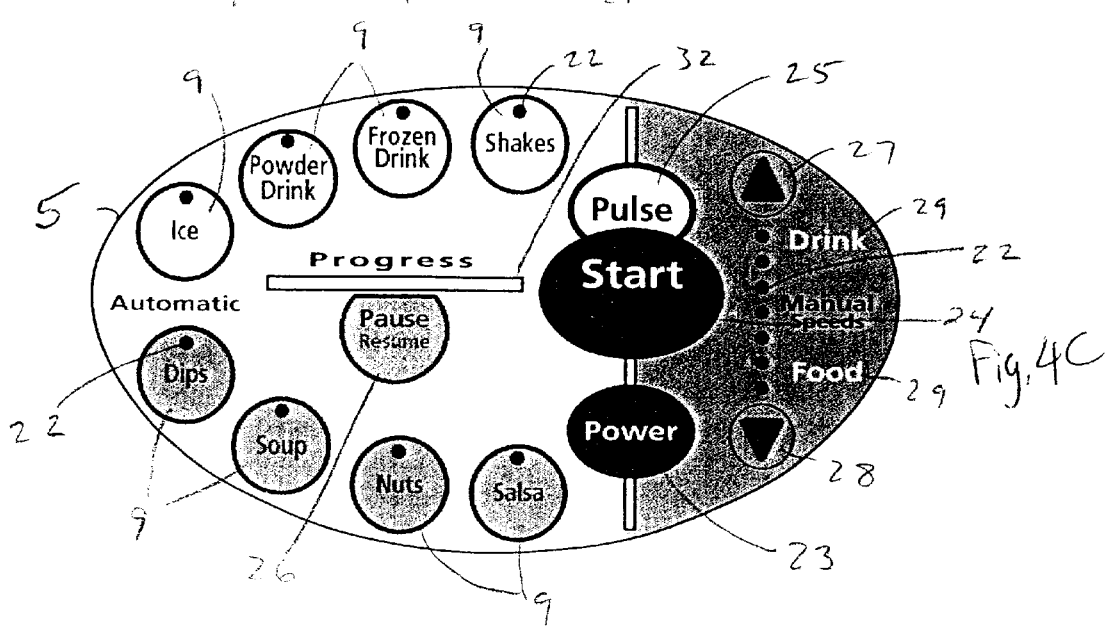

A plurality of preprogrammed function switches 9 is included on the LED-based user interfaces of FIGS. 4B and 4C. The function switches 9 represent various programs for functions or end results which have been preprogrammed into the read only memory 16. Thus, for example, pressing or touching a function switch 9 labeled "salsa" will cause microcontroller 15 to access memory section 19 of read only memory 16 for the program containing preprogrammed motor commands used to make salsa, and the preprogrammed commands will be executed by microcontroller 15 to control motor 10. One skilled in the art will recognize that these preprogrammed motor comments or routines may be written using any conventional programming language such as c plus, java, and the like. To alert the user which function or program is running, a LED 22 can light up on the particular function switch 9 that was pressed.

The LED-based variants of the user interfaces shown in FIGS. 4B and 4C may include a progress indicator 32 which indicates the relative completion of the program by color, lighted LED, or any other indicator means known in the art.

Figure 4D:
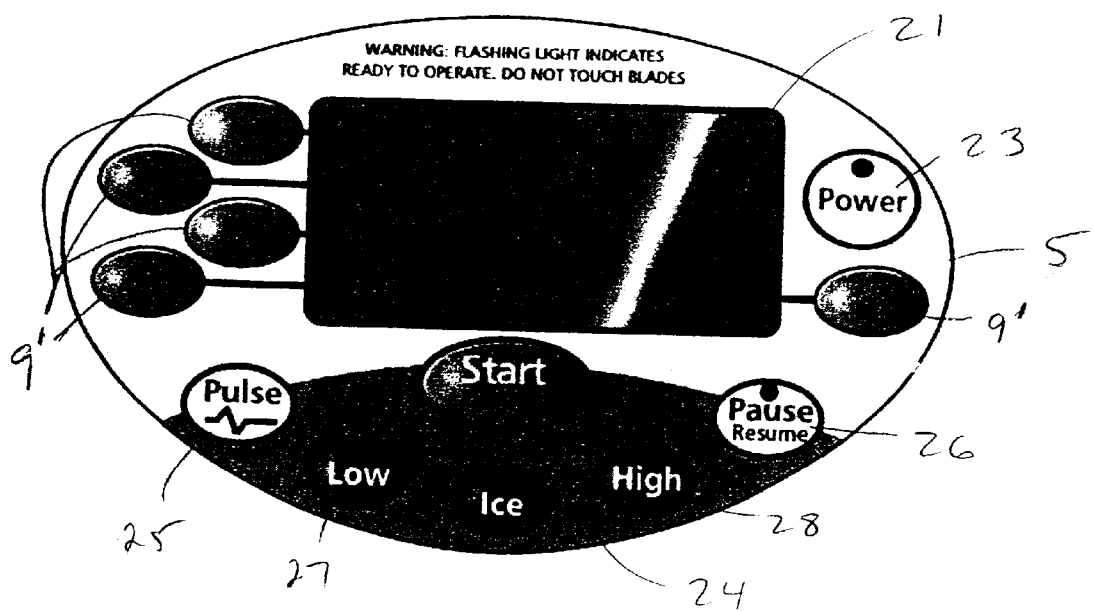

In an exemplary embodiment of a LCD based user interface shown in FIG. 4D, a plurality of function switches 9 is also used to choose the various functions or programs for the blender. Here, the function switches 9 are lined up to correspond to a preprogrammed function/program shown on the LCD 21 screen. To select the program displayed on the LCD 21 screen, the user only need to press the corresponding function switch 9'.

In another exemplary embodiment of a LCD-based user interface as shown in FIG. 4A, navigation switches 30 are used to choose the various functions or programs for the blender. Thus, as shown in FIG. 4A, navigation switches 30 are directional buttons (e.g., back, forward, up, down, or arrow symbols) which allow the user to navigate the LCD 21 screen until a particular function/program is selected using the select switch 31. A progress indicator, as well as a manual speed indicator, may appear on the LCD 21 screen.

The various switches 9 and 23–31 may be any kind of push button, membrane, or touch sensitive buttons or switch known in the art which sends a signal or command, or closes/opens a circuit when pressed or touched by the user.

Figure 5:
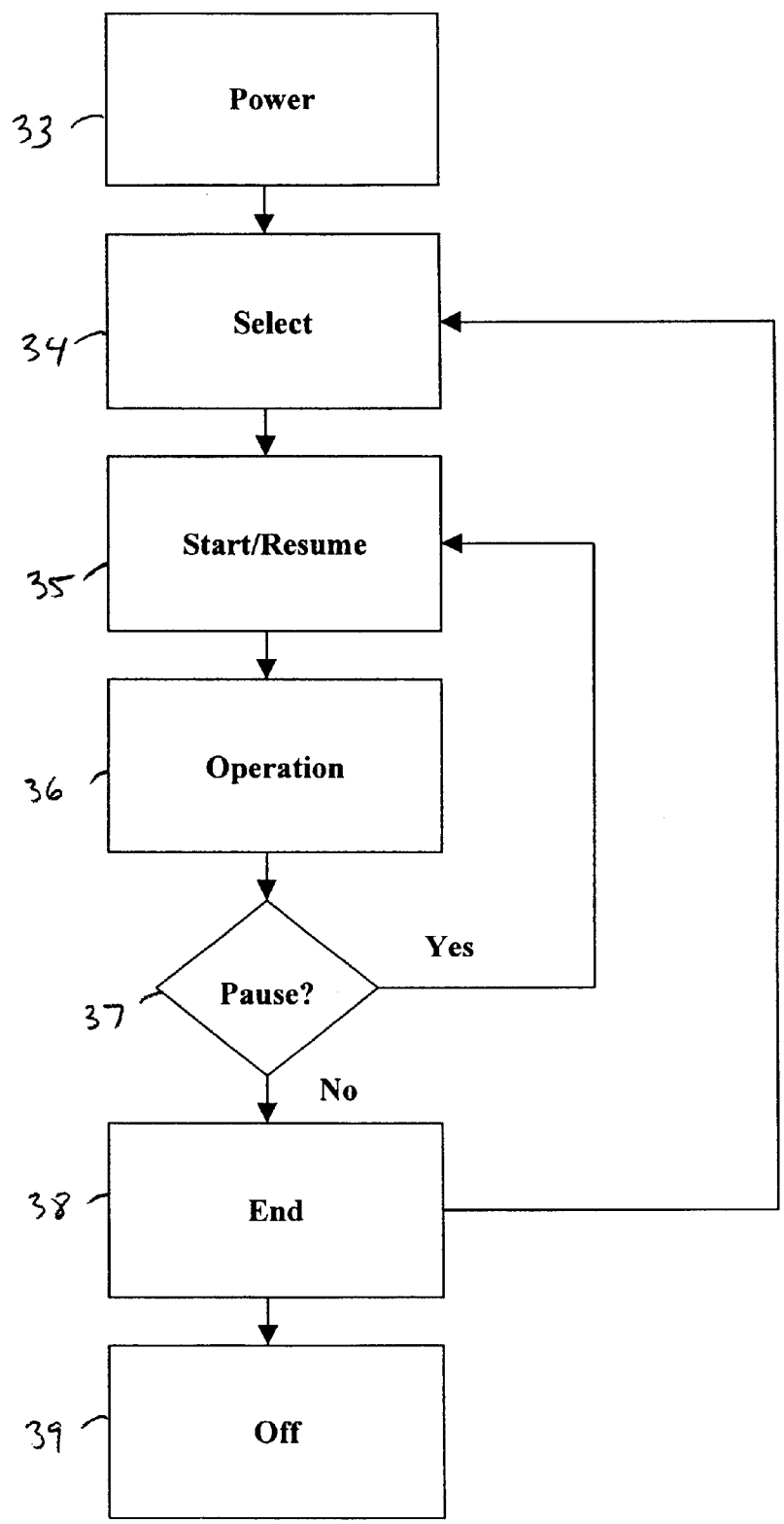
FIG. 5 is an exemplary flowchart illustrating the general logic of a LED blender apparatus in accordance with the present invention.

As shown in FIG. 5, in order to operate blender 1 with the LED-based user interfaces, the user first turns the power on at block 33 by pressing the power switch 23. After container 4 and blade unit 3 have been properly secured to base 2, and food or drink is loaded into container 4, the user then selects a function/program for the blender 1 at block 34 by pressing any of the various function switches 9. If there is a particular function switch which is not available (e.g., no preprogrammed motor controls for that function), the user can manually control the motor with manual speed switches 27 and 28. Additionally, a preset function switch 9 may not work if the sensor 40 detects an incompatible type of container 4 for that function. Manual speed switches 27 and 28 could be used in that situation as well. A LED 22 on the selected function switch 9 lights up to remind the user of the current selection.

Once a function is successfully chosen, the start/stop switch 24 is pressed at block 35 to begin the programmed operation. The microcontroller 15 runs motor 10 based on the preprogrammed motor commands stored in read only memory 16 for that selected function or program. Preprogrammed motor commands can include instructions on, for example, how fast the motor will run, the direction of blade rotation, the reversal of the blade rotation direction, the duration of rotation in a given direction, the oscillation of the blade unit, etc. A soft start program in the microcontroller 15 controls or slows the acceleration of the motor to a desired speed for better processing or mixing than prior conventional blenders where the motor accelerates to the maximum speed as fast as possible.

As motor 10 runs during operation block 36, the progress of the program is displayed on progress indicator 32 while the microcontroller 15 continues to execute the preprogrammed motor commands. There may be an overheating prevention control programmed into the microcontroller 15 (e.g., programming a limit as to how much power may be supplied to the motor).

At block 37, the pause/resume switch 26 is optionally pressed by the user to temporarily stop the blender operation. The program remains in effect, but the implementation of the preprogrammed motor commands is suspended and the status stored so that when the pause/resume switch 26 is pressed again at block 35, the microcontroller 15 at operation block 36 will simply resume the program from where it left off. Thus, for example, if the program contained a preprogrammed motor command to rotate the motor at 60 rps for ten seconds, and the pause/resume switch 26 is pressed at block 37 five seconds into the program, then when the pause/resume switch 26 is pressed again at block 35, the motor will resume rotation at 60 rps for another five seconds before ending the program.

If the operation has not been paused, then the program simply continues until all of the preprogrammed motor commands for that function or program are fulfilled at block 38. A termination tone may sound to alert the user of the program completion. If the user is not satisfied with the result and would like to continue the same program for an arbitrary time period, the user may depress the pulse switch 25 after the program ends.

The user can then turn off the blender at block 39, or begin the process again at block 34 by loading new materials into container 4 and then selecting a function/program.

Figure 6:
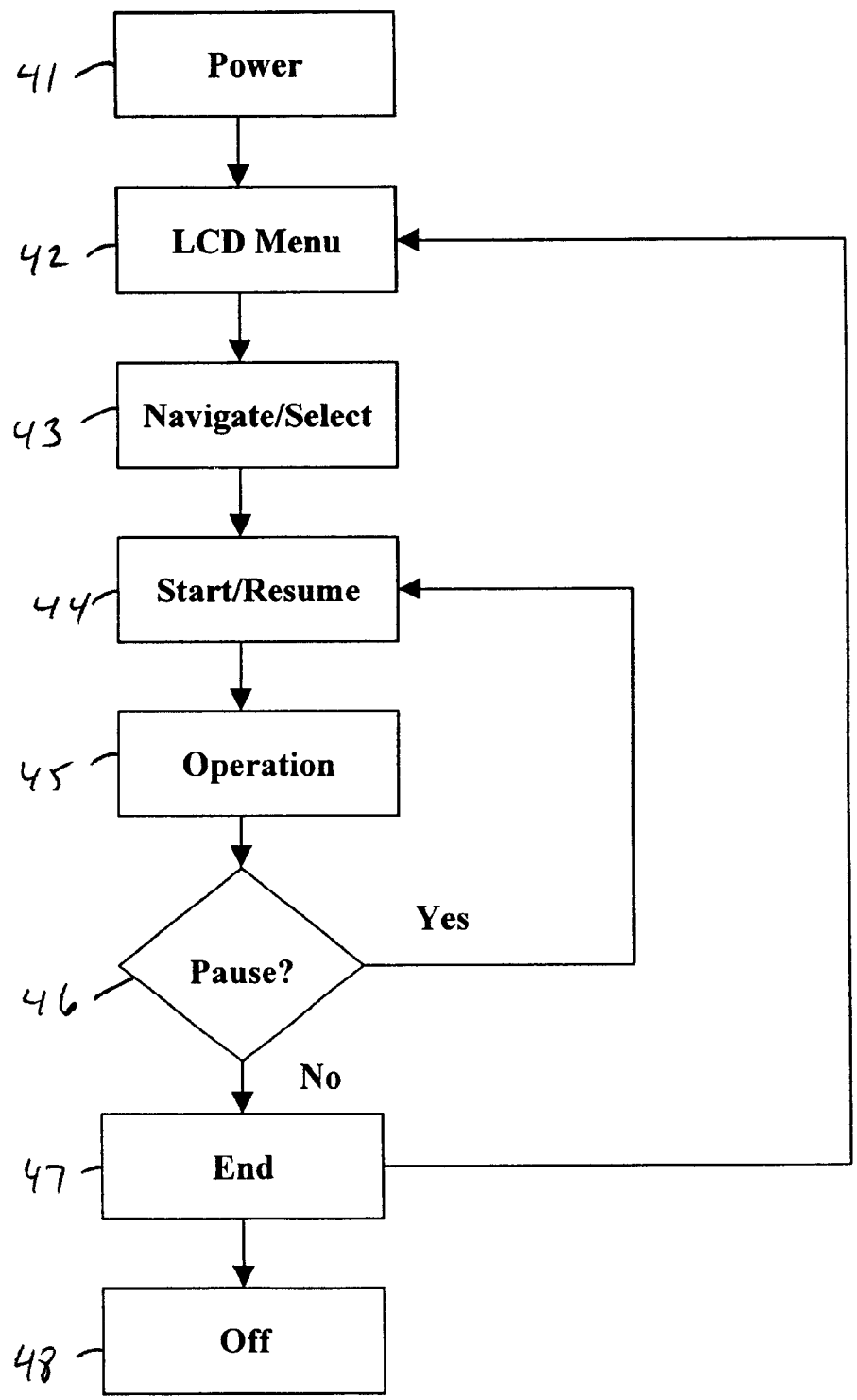
FIG. 6 is an exemplary flowchart illustrating the general logic of a LCD blender apparatus in accordance with the present invention.

FIG. 6 illustrates a logic flowchart for the operation of a blender with an LCD-based user interfaces. The power is first turned on at block 41 by pressing power switch 23. A menu of options is then displayed on LCD 21 at block 42. A standard menu may appear each time the power is turned on, or the menu may vary depending on which container 4 is placed on the base 2 as detected by sensor 40. For example, if sensor 40 identifies a blender container on base 2, then the LCD menu would display blender functions (e.g., mixing powder drinks, salsa, etc.) instead of food processor functions (e.g., fruits, vegetables, etc.) The menu may also include an option for choosing which language or measurement unit to display. Additionally, the menu may be set up depending on the most frequently selected functions or programs by the user. As described earlier, $E^2$ PROM 17 can be programmed to remember the most popular selections and to display them at the start of each operation for the user to choose.

At block 43, the user navigates through the LCD menu using the navigation switches 30 and makes selections using the select switch 31, or the user simply makes a selection using the function switch 9. If a particular function is not available on the menu, the user can manually control the motor with manual speed switches 27 and 28. A function may not be displayed if the preprogrammed motor controls for that function are not available, or if that function is not available for the type of container detected by sensor 40.

Once a function is chosen, the start/stop switch 24 is then pressed at block 44 to begin the operation. The microcontroller 15 then runs motor 10 based on the preprogrammed motor commands stored in read only memory 16 for that selected function/program. Microcontroller 15 may also be programmed with a "soft start" feature to control the acceleration of the motor to the desired speed.

As motor 10 runs at operation block 45, the progress of the program is displayed on LCD 21 while the microcontroller 15 continues to monitor and implement the preprogrammed motor commands. As described earlier, microcontroller 15 can also be programmed with an enhanced speed control for the motor as well as an overheating prevention control.

At block 46, the pause/resume switch 26 may be pressed to temporarily stop the program (e.g., suspending the current implementation of preprogrammed motor commands). The status of these commands are stored by $E^2$ PROM 17 so that when the pause/resume switch 26 is pressed again at block 44, the microcontroller 15 at operation block 45 will simply run the program from where it left off.

If the operation has not been paused, then the program simply continues until all of the preprogrammed motor commands for that function are fulfilled at block 47. A termination tone may sound to alert the user of the program completion. If the user is not satisfied with the result and would like to continue the same program for an arbitrary time period, the user may depress the pulse switch 25 after the program ends.

At the end of the program, the LCD 21 will return to block 42 to display the menu again and the user may proceed with another operation. Alternatively, the user can turn off the blender at block 48.

What is claimed is:

1. A blender comprising:

a base, said base including a motor, a microcontroller and a user interface,
  said microcontroller being in communication with said motor and said user interface, and
  said microcontroller comprising a central processing unit, a read only memory and a nonvolatile memory, said read only memory including preprogrammed routines associated with a plurality of predetermined functions;

a sensor assembly, said sensor assembly being in communication with said microcontroller and comprising a plurality of female members on said base and a male member on a container so as to be able to sense the presence and type of said container, and a blade base, said blade base including a blade unit having at least a first blade and a second blade having a different design from the first blade, said blade unit connected to said base on one end and to said container on the other end so that said motor may actuate said blade unit of said blade base;

wherein said microcontroller is operative to retrieve said routines from said read only memory and operate said motor based on said preprogrammed motor routines.

2. The blender of claim 1, wherein said user interface comprises a plurality of function switches associated with said routines and a display for each of said plurality of function switches,
  said display illuminating when a respective one of plurality of function switches is activated.

3. The blender of claim 1, wherein said user interface includes a progress indicator.

4. The blender of claim 1, wherein said user interface includes a first manual speed switch, a second manual speed switch, and a manual speed indicator coupled to said microcontroller.

5. The blender of claim 4, wherein said manual speed indicator comprises at least one light emitting diode which is responsive to actuation by said first manual speed switch or said second manual speed switch.

6. The blender of claim 1, wherein the user interface includes one of a light emitting diode display and a liquid crystal display.

7. The blender of claim 6, wherein the microcontroller is operative to display a menu of functions on said liquid crystal display.

8. The blender of claim 7, wherein said user interface includes a plurality of function switches, each associated with one of said functions on said liquid crystal display.

9. The blender of claim 6, wherein the microcontroller is operative to display a menu of functions most commonly chosen functions on said liquid crystal display.

10. The blender of claim 1, wherein said first blade is a four prong blender blade.

11. The blender of claim 10, wherein said second blade is not a conventional blender blade.

12. The blender of claim 1, wherein said motor is capable of rotating said blade unit in a clockwise and a counter-clockwise direction.

13. The blender of claim 1, wherein said sensor assembly is operative to detect said container and said microcontroller is operative to retrieve and implement a respective one of said preprogrammed routines upon detection of said container.

14. The blender of claim 1, wherein said container comprises a lid, an opening, and a cap for said opening, said cap being capable of forming a connection with said blade base to disengage said blade base from said container.

15. The blender of claim 1, wherein said blade unit comprises an extraction mechanism to extract the blade.

16. The blender of claim 1, wherein said container comprises ingredient markings.

17. The blender of claim 16, wherein said ingredient markings are removable.

18. The blender of claim 1, wherein said user interface includes a pause switch and said microcontroller is operative to pause said program and resume said program in response to activation of said pause switch.

19. The blender of claim 1, wherein said user interface includes a pulse switch and said microcontroller is operative to continue said operation of said motor in response to activation of said pulse switch.

20. The blender of claim 1, wherein said nonvolatile memory is an $E^2$ PROM.

* * * * *